(12) United States Patent
Preston et al.

(10) Patent No.: US 12,395,410 B2
(45) Date of Patent: Aug. 19, 2025

(54) SPANNING CONTENT TREE FOR INTELLECTUAL CAPITAL CREATION AND CONFIGURATION COMPLETION FUNCTION THROUGH GENERATIVE ARTIFICIAL INTELLIGENCE PROMPT PIPELINE

(71) Applicant: Cisco Technology, Inc., San Jose, CA (US)

(72) Inventors: Corey James Preston, Pope Valley, CA (US); Jordan Michael Clemens, Dudley, NC (US); Nagendra Kumar Nainar, Morrisville, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 18/591,588

(22) Filed: Feb. 29, 2024

(65) Prior Publication Data
US 2025/0233802 A1    Jul. 17, 2025

Related U.S. Application Data

(60) Provisional application No. 63/621,323, filed on Jan. 16, 2024.

(51) Int. Cl.
*H04L 41/16* (2022.01)
*H04L 41/5009* (2022.01)

(52) U.S. Cl.
CPC ......... *H04L 41/16* (2013.01); *H04L 41/5009* (2013.01)

(58) Field of Classification Search
CPC ........................ H04L 41/16; H04L 41/5009
See application file for complete search history.

(56) References Cited

U.S. PATENT DOCUMENTS

| | | | |
|---|---|---|---|
| 10,410,219 B1 * | 9/2019 | El-Nakib | G06F 16/90332 |
| 10,681,402 B2 * | 6/2020 | Seshadri | H04N 21/2407 |
| 11,748,577 B1 | 9/2023 | Aberle | |
| 2019/0096280 A1 * | 3/2019 | Saunders | G06F 11/3013 |
| 2021/0027220 A1 * | 1/2021 | Khan | G06F 9/453 |

(Continued)

FOREIGN PATENT DOCUMENTS

| | | |
|---|---|---|
| CN | 116541536 A | 8/2023 |
| CN | 117271792 A | 12/2023 |

*Primary Examiner* — Philip C Lee
(74) *Attorney, Agent, or Firm* — Edell, Shapiro & Finnan, LLC

(57) ABSTRACT

Methods for providing spanning content tree for generating on-demand, persona-based, and journey-aware support content using machine learning. The methods involve obtaining input data related to a configuration or an operation of one or more assets in an enterprise network and based on the input data, obtaining network information about the one or more assets of the enterprise network and base support content that includes information about configuring or operating the one or more assets in the enterprise network. The methods further involve performing generative artificial intelligence learning on the base support content using the network information to generate targeted support content specific to the input data and the one or more assets of the enterprise network. The methods further involve providing the targeted support content for changing the configuration or the operation of the one or more assets in the enterprise network.

20 Claims, 9 Drawing Sheets

(56) References Cited

U.S. PATENT DOCUMENTS

| | | |
|---|---|---|
| 2022/0405481 A1 | 12/2022 | De Ridder |
| 2023/0085061 A1* | 3/2023 | Ma et al. |
| 2025/0077859 A1* | 3/2025 | Sun ..................... G06N 3/0455 |
| 2025/0095690 A1* | 3/2025 | Chi ..................... G11B 27/031 |

* cited by examiner

SPANNING CONTENT TREE FOR INTELLECTUAL CAPITAL CREATION AND CONFIGURATION COMPLETION FUNCTION THROUGH GENERATIVE ARTIFICIAL INTELLIGENCE PROMPT PIPELINE

CROSS-REFERENCE TO RELATED APPLICATION

This application claims the benefit of priority under 35 U.S.C. § 119 (e) to U.S. Provisional Application No. 63/621,323, filed on Jan. 16, 2024, which is hereby incorporated by reference in its entirety.

TECHNICAL FIELD

The present disclosure relates to computer networking, data management, and data communications.

BACKGROUND

Generating support content such as articles and videos is meticulous and time-consuming processes. Support content may include steps or instructions to complete a network task, user interface (UI) screenshots, and/or videos. For network management, support content may include information for configuring network devices. For example, the support content may be step by step instructions for configuring a network port to connect a network device to an enterprise network. Support content creation is typically a manual task that relies heavily on human input. Consequently, support content tends to be general information, "same for all", regardless of user's experience and knowledge.

DESCRIPTION OF EXAMPLE EMBODIMENTS

Overview

Briefly, methods are presented for providing spanning content tree for generating on-demand, persona-based, and journey-aware support content using machine learning (ML) and/or artificial intelligence (AI). In these methods, dynamic, up to date, and personalized workflows are generated.

In one form, the methods involve obtaining input data related to a configuration or an operation of one or more assets in an enterprise network. The methods further involve, based on the input data, obtaining network information about the one or more assets of the enterprise network and base support content that includes information about configuring or operating the one or more assets in the enterprise network. The methods further involve performing generative artificial intelligence learning on the base support content using the network information to generate targeted support content specific to the input data and the one or more assets of the enterprise network. Moreover, the methods involve providing the targeted support content for changing the configuration or the operation of the one or more assets in the enterprise network.

EXAMPLE EMBODIMENTS

Figure 1:
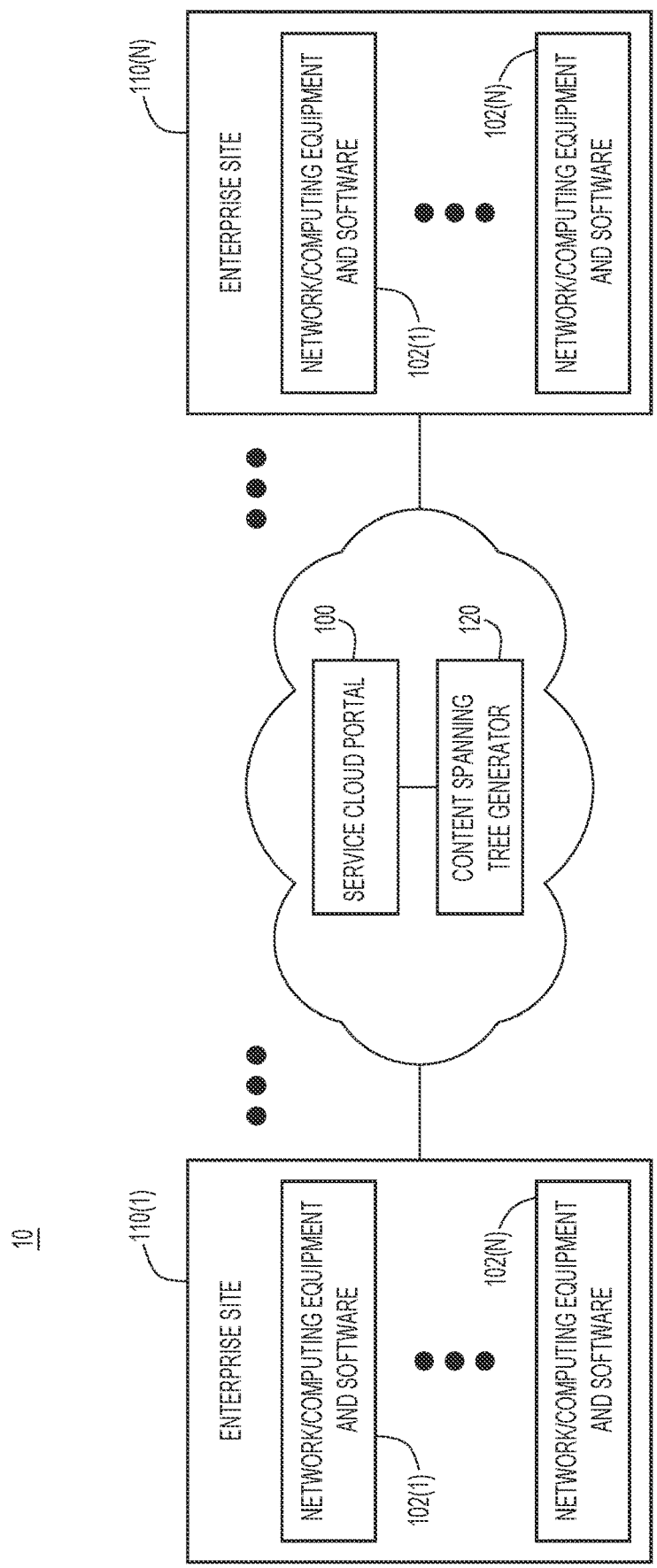
FIG. 1 is a block diagram of an environment that includes a spanning content tree generator that interacts with an enterprise service cloud portal and network/computing equipment and software residing at various enterprise sites, or in cloud deployments of an enterprise, according to an example embodiment.

FIG. 1 is a block diagram of an environment 10 that includes a spanning content tree generator 120 that interacts with an enterprise service cloud portal (a cloud portal 100) and network/computing equipment and software 102(1)-102(N) residing at various enterprise sites 110(1)-110(N), or in cloud deployments of an enterprise, according to an example embodiment.

The notations 1, 2, 3, . . . n; a, b, c, . . . n; "a-n", "a-d", "a-f", "a-g", "a-k", "a-c", and the like illustrate that the number of elements can vary depending on a particular implementation and is not limited to the number of elements being depicted or described. Moreover, this is only examples of various components, and the number and types of components, functions, etc. may vary based on a particular deployment and use case scenario.

The environment 10 is one example of an enterprise network. The environment 10 may involve multiple enterprise networks. The network/computing equipment and software 102(1)-102(N) are resources or assets of an enterprise (the terms "assets" and "resources" are used interchangeably herein). The network/computing equipment and software 102(1)-102(N) may include any type of network devices or network nodes such as controllers, access points, gateways, switches, routers, hubs, bridges, gateways, modems, firewalls, intrusion protection devices/software, repeaters, servers, and so on. The network/computing equipment and software 102(1)-102(N) may further include endpoint or user devices such as a personal computer, laptop, tablet, and so on. The network/computing equipment and software 102(1)-102(N) may include virtual nodes such as virtual machines, containers, point of delivery (POD), and software such as system software (operating systems), firmware, security software such as firewalls, and other software products. The network/computing equipment and software 102(1)-102(N) may be in a form of software products that reside in an enterprise network and/or in one or more cloud(s). Associated with the network/computing equipment and software 102(1)-102(N) is configuration data representing various configurations, such as enabled and disabled features. The network/computing equipment and software 102(1)-102(N), located at the enterprise sites 110(1) -110(N), represent information technology (IT) environment of an enterprise.

The enterprise sites 110(1)-110(N) may be physical locations such as one or more data centers, facilities, or buildings located across geographic areas that designated to host the network/computing equipment and software 102(1)-102(N). The enterprise sites 110(1)-110(N) may further include one or more virtual data centers, which are a pool or a collection of cloud-based infrastructure resources specifically designed for enterprise intents, and/or for cloud-based service provider intent.

The network/computing equipment and software 102(1)-102(N) may send to the cloud portal 100, via telemetry techniques, data about their operational status and configurations so that the cloud portal 100 is continuously updated about the operational status, configurations, software versions, etc. of each instance of the network/computing equipment and software 102(1)-102(N) of an enterprise.

The cloud portal 100 is driven by human and digital intelligence that serves as a one-stop destination for equipment and software of an enterprise to access insights and expertise (i.e., support content for enterprise assets). The cloud portal 100 may involve assets and coverage, cases (errors or issues to troubleshoot), automation workbench, insights with respect to various stages of an adoption lifecycle and action plans to progress to the next stage, etc. Insights may be provided in a form of support content that includes information about one or more network features, configurations, etc. Support content may further include contextual learning, expert resources, analytics, and configuration instructions. Support content may be provided in various forms such as but not limited to multimedia data (multiple video recordings) collected from different data sources, video tutorial recordings, video learning seminars, debugging or troubleshooting videos, and/or other network related videos e.g., for progressing a network technology along an adoption lifecycle or changing the configuration of one or more affected network devices. For example, the support content may include step-by-step instructions or action tasks e.g., to enable a network feature or configure a network device. In one example embodiment, a configuration completion function is provided which, when selected, automatically configures or reconfigures the network device.

A network technology is a computing-based service or a solution that solves an enterprise network or a computing problem or addresses a particular enterprise computing task. The network technology may be offered by a service provider to address aspects of information technology (IT). Some non-limiting examples of a network technology include access policies, security and firewall protection services, software image management, endpoint or user device protection, network segmentation and configuration, software defined network (SDN) management, data storage services, data backup services, data restoration services, voice over internet (VOIP) services, managing traffic flows, analytics services, etc. Some network technology solutions apply to virtual technologies or resources provided in a cloud or one or more data centers. The network technology solution implements a particular enterprise outcome and is often deployed on one or more of the network/computing equipment and software.

An adoption of network technology solution refers to enterprise's uptake and utilization of a network technology for achieving a desired outcome. A journey refers to end-to-end activities performed by an enterprise when adopting a network technology including tasks they perform and defined stages to progress. An adoption lifecycle refers to a step-by-step guidance along the adoption journey to accelerate the speed to value of a network technology. The adoption lifecycle may encompass the end-to-end journey stages of: need, evaluate, select, align, purchase, onboard, implement, use, engage, adopt, optimize, recommend, advocate, accelerate, upgrade, renew, etc.

Various IT specialists (users) interact with the cloud portal 100 to manage network devices and software of the enterprise. The users may need to refer to support content to understand how to configure a network device, upgrade an enterprise software asset, etc.

In related art, support content is manually written by users i.e., product developers. Accurately compiling information for the support content leaves little to no time for adding persona and/or journey-based improvements to the support content. Lack of personalization in the support content may lead to abandonment of attempted configurations resulting in case creation or even returning the device and/or service (refunds).

Moreover, content creation is typically limited to or prepared based on the knowledge possessed by the author (content creator), which may be outdated or may result in a biased view of the content. For example, initial content created by a testing team may be based on limited testing performed or based on the software/firmware running on the test device, which may not necessarily accurately define the feature functionality e.g., on a different device.

These are just some examples of challenges encountered with generating support content. There are also challenges in maintaining support content. For example, support content may involve frequent updates as firmware, hardware, and software change over time. These updates are tedious, time consuming, and error prone.

Moreover, some users do not complete all the steps described in the support content, which may result in an increased number of dead ends in a device configuration process. As such, the rate of users abandoning support content is rather high.

Also, users have varied skills and competency, which may be an obstacle to successfully integrating a given network configuration. For example, some users may not have the necessary skills and cannot successfully follow the steps in the support content. Complex networking concepts, intricate steps, and/or a lack of engaging visuals contribute to users abandoning articles or videos (i.e., the support content) midway, seeking alternative help sources, resorting to trial-and-error methods, or creating a case requiring technical assistance and intervention.

Support content does not fall under "one size fits all" category and may benefit from a persona-based angle. For example, a highly qualified expert user may investigate an article or a video for a very specific answer and may not be interested in learning basic information about the functionality described in the support content. On the other hand, a novice user may be interested to learn the basics and not keen about learning the advanced or more specific details during the initial reading.

To address at least some of these challenges in generating and maintaining support content, a spanning content tree generator 120 is provided that interacts with the cloud portal 100 to obtain information about the enterprise network. Specifically, the spanning content tree generator 120 obtains input data (such as user input or query). Based on the input data, the spanning content tree generator 120 obtains network information about assets of the enterprise network and base support content that includes information about configuring and operating one or more assets in the enterprise network. The spanning content tree generator 120 then performs generative artificial intelligence learning on the base support content using the network information to generate targeted support content specific to the input data and the one or more assets of the enterprise.

In one or more example embodiments, the spanning content tree generator 120 may automatically generate personalized and up to date support content i.e., the targeted support content. The spanning content tree generator 120 may reduce (if not remove) manual labor dependency and use a dynamic workflow to generate and maintain personalized support content that is up to date (targeted support content). While there may be many content creation products, technical documentation has not been successfully brought to value realization. Existing or off-the-shelf content creation products are prone to hallucination and other errors. On the other hand, the techniques presented herein may elevate user education while also lower the bar to complete network configurations.

The spanning content tree generator 120 may also reduce content creation time by utilizing generative artificial intelligent (AI) and then enhance the generated content using human polishing efforts and a closed-loop AI/machine learning approach. The spanning content tree generator 120 may leverage early feature documentations and product training material as a foundation (base support content) for the creation and expansion of persona-aware and journey-aware content variations (targeted support content).

Additionally, the spanning content tree generator 120 may leverage a closed-loop feedback approach to further improve the support content based on the reading pattern of the user. Personalizing content enables a quicker return on the effort of consuming the support content. The spanning content tree generator 120 may further provide content consumption that enacts a given configuration on the user's device detailing the caveats/impacts and differences to the user's existing configuration.

The techniques presented herein, that may be executed by the spanning content tree generator 120, use AI such as Large Language Model (LLM) applications to ingest a discrete training course as "seed content", and output a slate of persona based content that is built upon by users. The spanning content tree generator 120 closes the loop on user configurations by automating the deployment of the configurations to the user's selected network e.g., a particular enterprise network. The techniques presented herein may leverage AI and human feedback to generate and provide complete solutions for self-serve users.

While in example embodiments described below, Large Language Models (LLMs) are deployed, this is just one non-limiting example of AI/ML models. In another example embodiment, other AI/ML models may be deployed to generate support content including actionable tasks and to train the spanning content tree generator 120 to generate targeted support content. Some non-limiting examples of AI/ML models include unsupervised machine learning, supervised machine learning, deep neural networks, generative adversarial network, large language models (LLMs) such as recurrent neural networks, generative pre-trained transformers (GPT), bidirectional encoder representations from transformers (BERT), text-to-text transfer transformers (T5).

In one or more example embodiments, the spanning content tree generator 120 generates a base version of the support content (a tree trunk) for a particular enterprise asset i.e., network/computing equipment and software 102(1)-102(N) such as a service feature, a network service, or an enterprise device. The spanning content tree generator 120 further builds on the base support content (branches for the tree trunk) with updates, step-by-step instructions, configuration scripts, etc. The spanning content tree generator 120 may reduce time for generating the support content and generates targeted support content that may include additional data specific to the assets of the enterprise network and the user, which is typically omitted in related art due to time restrictions in creating support content.

For example, a user is to enable/modify feature X on a network device. Content support document explains how to enable feature X and shows an example of the feature X being enabled based on the user's actual network configuration, which is generated using generative AI. Additionally, the content support document is specifically generated for the user (or appropriate sections shown), which is related to what the user is trying to accomplish, a task at hand, (e.g., enable feature X). In other words, the techniques presented herein dynamically generate modified content support document targeted to the user's task and network configuration.

As noted above, because of variations in enterprise assets and user skills, same support content for all users may not be a good approach. A user may become confused, abandon the support content (i.e., close or exit the support content), and open a new technical support case instead. To address at least some of these issues, the spanning content tree generator 120 generates one or more completed meta-prompts which are user queries augmented with contextual metadata related a user persona and/or a task at hand. The completed meta-prompts are then fed, as input, into generative AI learning to generate customized support content (targeted support content) that is specific to the user and the task at hand. As such, new support cases (technical assistance tickets) may be avoided or at least the number of such new support cases may be reduced.

In one or more example embodiments, the completed meta-prompts are based on enterprise network information such as network information about network/computing equipment and software 102(1)-102(N), which may include different hardware and software that host network services for the enterprise services (e.g., product families, asset groups) and may run different features and configurations to enable the enterprise services.

Further, the spanning content tree generator 120 generates task-specific support content based on network domain knowledge i.e., this network information. The network information includes network configuration information, network topology information, operations related data or telemetry data indicative of operations of the enterprise asset. That is, different support content is provided based on the context or the task at hand (e.g., security patch, software upgrade, installing a port, connecting a router to the enterprise network, etc.). The spanning content tree generator 120 uses generative artificial intelligence learning of the base support content based on the network information of the enterprise network to generate task-specific support content.

As such, the spanning content tree generator 120 accounts for differences in the enterprise assets based on this network information when generating the support content especially when generating instructions or actionable tasks for the assets. For example, using a device emulator, screen shots and/or videos with semantic actionable tasks (step by step instructions) may be generated based on a device vector search. Actionable tasks may involve changing the configuration of the one or more affected network devices in the enterprise network. The configuration may be changed by establishing a connection with each of the one or more affected network devices using an application programming interface (API) and reconfiguring a hardware or a firmware on a respective network device.

These are just some non-limiting examples of various actionable tasks in the network domain. In one or more example embodiments, these actionable tasks maybe generated using an artificial intelligence (AI) model or a machine learning (ML) model. Based on user input, for example, these actionable tasks may be executed by the spanning content tree generator 120 and/or the cloud portal 100 e.g., by establishing a connection to a target asset (e.g., a network device) and using a command line interface (CLI) changing configuration of or reconfiguring the target asset (configuration changes may involve an operating system and/or firmware) and the connection may be established using an application programming interface (API).

In one or more example embodiments, actionable tasks are instructions for configuring, reconfiguring, and/or operating an enterprise network and/or one or more of network devices (enterprise assets) therein including establishing a connection to a respective device. Each actionable task may include one or more operations/computer-executable instructions/actions that may result in changes to the firmware, for example. At least some of the actions may be performed by the cloud portal 100 such as changing a configuration of or reconfiguring a particular network device(s), updating software asset(s) to a newer version, changing firmware, enabling a feature or a service on a device, configuring a network port, etc. The user is then notified that these automated actions were performed.

As an example, automated actions or actionable tasks may involve running a particular service of the enterprise, using a particular network technology, enabling one or more configuration features on affected group of network devices by establishing a connection with these network devices, and/or automatically installing the same security patch for a first network/computing equipment and software 102(1) and a second network/computing equipment 102(N), where the first network/computing equipment and software 102(1) and the second network/computing equipment and software 102(N) are similarly functioning devices located at different enterprise sites.

While one or more example embodiments describe actionable tasks for performing one or more actions associated with the enterprise network using the cloud portal 100, this is just an example. Actionable tasks may involve other services and/or systems. Actionable tasks may or may not involve the cloud portal 100. Actionable tasks may include a first action that involves a network management platform for a first enterprise site 110(1), a second action that involves a network controller of a network domain, and a third action that involves establishing a direct connection to one of the network/computing equipment and software 102(1)-(N) at a second enterprise site 110(N). Actionable tasks may also include automated actions performed in multiple management platforms and the like.

Additionally, the spanning content tree generator 120 may generate support content that is not only tailored to the enterprise network and the task at hand but also to the user based on user information. User information may involve user persona, user identity, and/or user network persona within an enterprise network and includes user's role(s) within the enterprise network i.e., tasks or activities that the user is to perform for the enterprise network. The user persona may be determined based on a user profile within each enterprise network and/or user's click-through history (activities of the user within each enterprise network). User persona may be determined in various ways such as embedding a user profile, user role within an enterprise network, and/or user click through history and applying neural networks or other machine learning/artificial intelligence models.

By way of a non-limiting example, a user persona may be a protector, an operator, a decider, a researcher, a planner, or a developer. The operator may focus on asset management such as status and performance of the network equipment and software 102(1)-102(N), whereas the planner may focus on an overall performance of the enterprise network (whether the enterprise has enough resources/assets to serve the operations, etc.).

User persona may further be based on different daily tasks performed by the user depending on the type, size, and job segmentation of their enterprise. For example, the operator may have a network role that focuses on hardware assets of the enterprise or may have a security role that focuses on operating system versions of the enterprise assets. The user persona may thus account for different jobs performed by the user. The user persona may further be different for different enterprises. For example, the planner may focus on enterprise network's reliability and stability for enterprise A while focusing on increasing the present network workload for enterprise B. That is, the user persona may account for different tasks performed by the user for different enterprises.

Moreover, the user persona may further be based on the skill level of the user. A user with the same role may have a different level of expertise or experience. For example, a network operator with ten years of experience and long activity history with the enterprise network has a different user persona than a network operator that is working less than year with the enterprise network and has a short activity history.

Based on different user personas, the spanning content tree generator 120 generates different support content (spans different trees) that are individually tailored to the user. By using the user persona (incorporating user embedding in generating a completed meta-prompt), the generated support content is tailored to satisfy conditions for specific tasks targeting on a certain user role.

Figure 2:
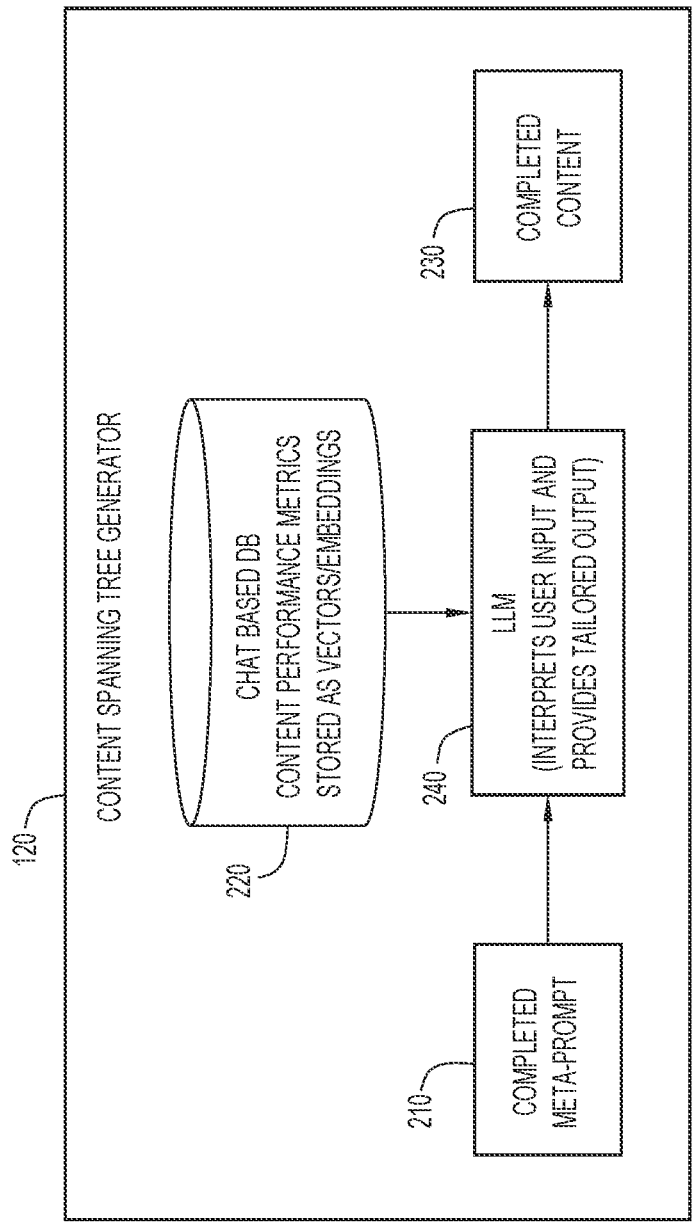
FIG. 2 is a block diagram illustrating the spanning content tree generator of FIG. 1 generating support content using an artificial intelligence (AI) model based on content performance metrics, according to an example embodiment.

With continued reference to FIG. 1, FIG. 2 is a block diagram illustrating the spanning content tree generator 120 generating support content using an artificial intelligence (AI) model based on content performance metrics, according to an example embodiment. The spanning content tree generator 120 inputs a completed meta-prompt 210 and performance metrics from a chat-based database 220, into a large language model (LLM 240) such that targeted support content is generated i.e., completed content 230.

Powered by generative AI, the completed content 230 includes domain knowledge and may be queried at any given time. By providing the LLM 240 with contextual guidelines, referred to as a "meta-prompt", content generation process is shaped based on dynamic and historical examples for quality and relevance (performance metrics from the chat-based database 220), adopting a meta-data focused approach to content development.

The completed meta-prompt 210 may be user input or query augmented with contextual information metadata related to the user persona (user embedding) based on a user profile, a user role within the enterprise network, and/or user activity history. The completed meta-prompt 210 may further be augmented with the task embedding, which may be based on the current stage of a plurality of stages in a lifecycle journey for the respective network enterprise asset.

The chat-based database 220 stores various support content sets that have different performance metrics (bad and good examples). In one example embodiment, the chat-based database 220 includes a content performance storage that stores prompts as contextual examples for content generation (good and bad examples based on user feedback). The chat-based database 220 stores the content performance metrics as vectors or embeddings, which are then input into the LLM 240 to generate the completed content 230.

For example, a meta-prompt (e.g., the completed meta-prompt 210) may involve "build a new article about {Virtual Local Access Network (VLAN) management} on the {Switch Y} {version 1.0} using the {command line interface (CLI)}", where "{ }" represents variables that include multiple good and bad examples as context provided by large language model (the LLM 240). The LLM 240 is just one example of a ML/AI model and other ML/AI models are within the scope of this disclosure. The LLM 240 generates various support content, which is then ranked by the user to train the LLM 240.

As such, the completed content 230 is generated by a trained LLM based on content performance (good examples) instead of a similarity search. When the completed content 230 is generated, the LLM 240 is fueled with well-reviewed content provided by users (good examples or content with high performance metrics). The content performance metrics may also be generated programmatically based on content performance such as an abandonment rate of the support content based on prior uses.

The completed meta-prompt 210 may be considered as analytics based retrieval-augmented generation (RAG) for content creation and personalization. Characteristics of content to be generated are determined based on performance of similar content and user profile. Performance may involve user feedback and whether users abandoned the content or implemented instruction in the content, etc. Functionally, the meta-prompt construction includes queries to the backend (the chat-based database 220) for the most up to date versions of the support content. The trunk content is the base version (base content) that is loaded when the user is not identified (e.g., no user identifier (ID) for the user). It is content complete but not personalized and designed for the widest possible audience. If the user is identified, the content is span, further updated (e.g., by the LLM 240), based on users' persona/journey to generate the completed content 230, which is then persona-based and journey-aware. Additionally, network information may be analyzed to generate content specific to an enterprise network of the user.

Figure 3:
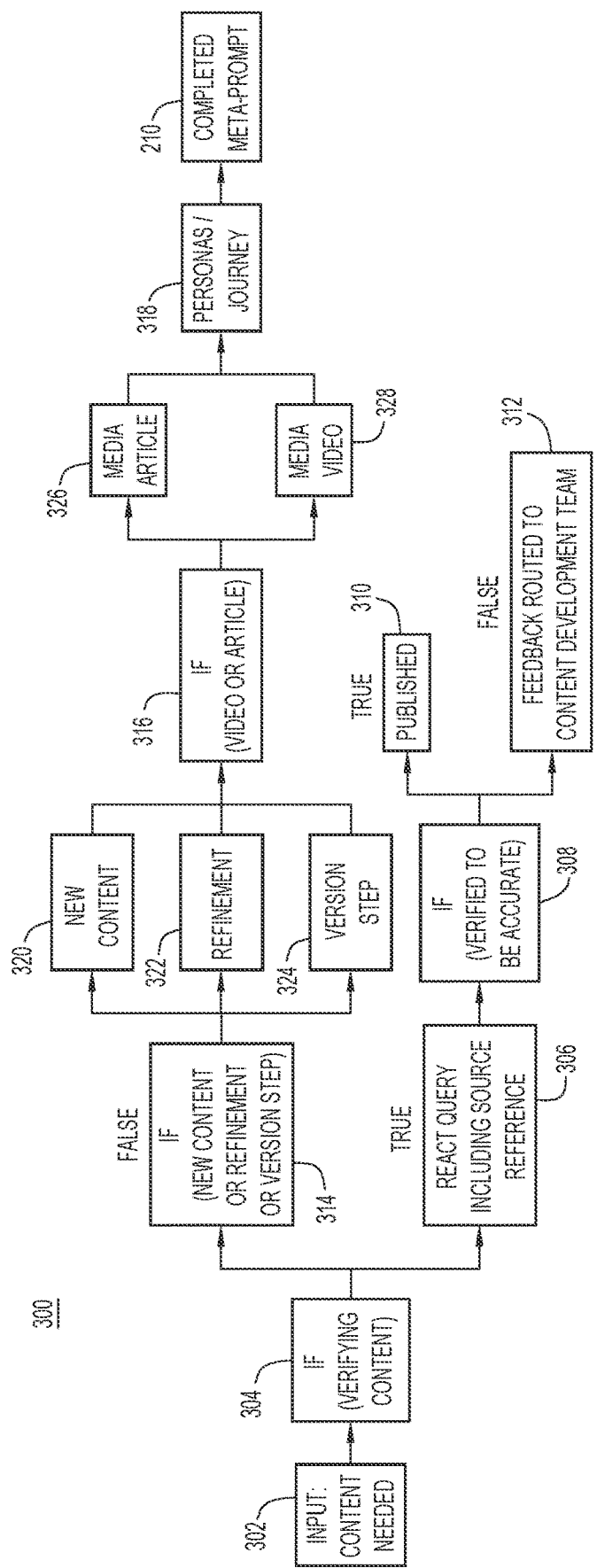
FIG. 3 is a flow diagram illustrating a process of generating a completed meta-prompt of FIG. 2, according to an example embodiment.
Figure 4:
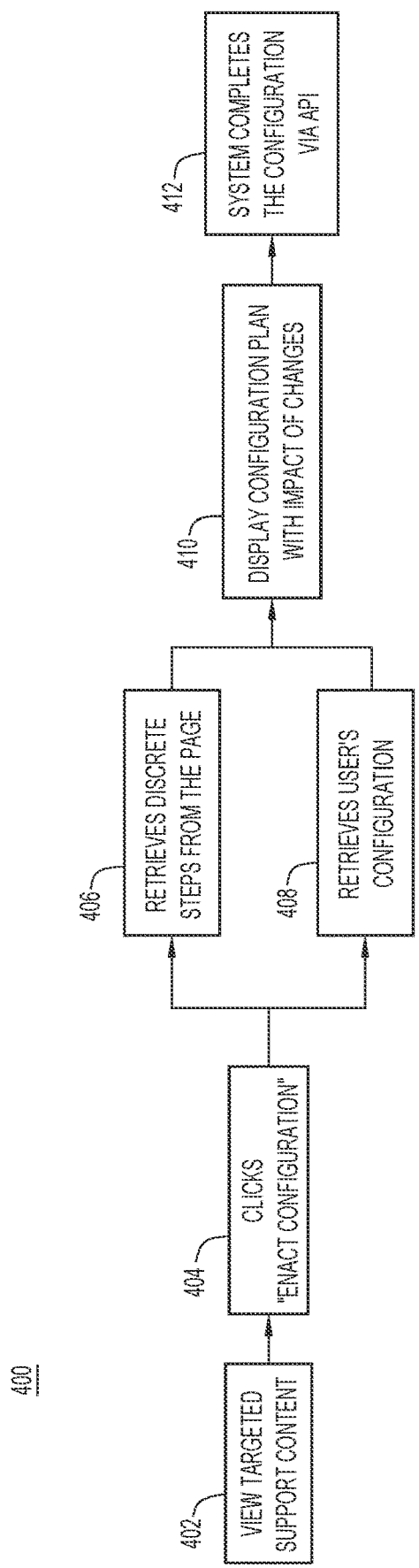
FIG. 4 is a diagram illustrating a configuration automation process for configuring or operating one or more assets of an enterprise network based on configuration automation in the targeted support content, according to an example embodiment.

With continued reference to FIGS. 1 and 2, FIG. 3 is a flow diagram illustrating a process 300 of generating the completed meta-prompt 210 of FIG. 2, according to an example embodiment. The process 300 may be implemented by a computing device/a group of servers/or in a cloud.

The process 300 involves at 302, obtaining content material as input. Content material may include raw data such as objective of the content material, applicable devices (e.g., switches X, Y, and Z), configuration operations to perform, etc.

Once the content material is input, the process 300 proceeds to analyze and process the content material. Specifically, at 304, a check is performed to determine whether the content material is submitted for verification or is to be added to the knowledge base/knowledge domain.

If the content material is submitted for verification, at 306, the knowledge domain is queried e.g., source material reference, to determine the validity and/or accuracy of the content material (support content set). At 308, a determination is made whether the content material is verified. If the content material is verified, at 310, the content material is published e.g., in the knowledge domain. On the other hand, if the content material cannot be verified, at 312, the content material is provided to another source for checking e.g., feedback routed to content development team or content development service.

Referring back to operation 304, if the content material is to be added to the knowledge domain, the process 300 proceeds to analyze the content material (support content set). Specifically, at 314, another determination is made as to whether the content material is new content 320, edited content (a refinement 322), or a new version of existing content (a version step 324). Based on the foregoing, existing content maybe retrieved and content material added or new content may be generated.

Additionally, the content material (support content set) is semantically analyzed (various sections-objective, applicable devices, instructions, etc.) and type of content material is determined. That is, in the process 300, at 316, a type of content material is determined such as a media article 326 or a media video 328, as examples. The content material may involve various types of content (e.g., multimedia data, audio, video, images, and/or text). At 318, user persona and/or task at hand are determined and augmented, to generate the completed meta-prompt 210 for the LLM or another AI model.

Referring back to FIG. 2, the completed meta-prompt 210 is fed into the LLM 240 together with good and bad examples of support content sets from the chat-based database 220. For example, the chat-based database 220 includes a natural language query database. User feedback mechanisms e.g., represented by the "Thumbs up" and "Thumbs down" indicators (performance metrics), are systematically monitored and readily available for analysis based on being stored in the chat-based database 220 (bad examples vs. good examples). Performance metrics in the chat-based database 220 may be accessed through two channels: first, a chat interface for management reporting and second, programmatically during support content creation runtime, allowing for comprehensive evaluation and improvement of the support content and system.

In one example embodiment, to update the targeted support content based on user's persona and/or journey (task at hand), the spanning content tree generator 120 actively monitors user's behavior (e.g., click history) to identify at which point the user abandoned the targeted support content or a part of the support content that is being skipped based on the user persona. The user login identifier (ID) may be leveraged to classify the type of user that is currently consuming (using/reading/viewing) the support content such as an article. For example, the type of user may be a certified internetwork expert with ten years of work experience or a new user with no certifications. That is, performance metrics for respective support content sets may be generated based on prior user abandonment, skipped portions, etc. and may be specific to a user type or user persona.

To improve the performance metrics of the respective support content set, a configuration automation may be generated. For example, users that abandon the target support content but attempt to open a new case may be provided with an option to complete the configuration of the one or more assets of the enterprise network via a dedicated user interface (UI). Thus, a seamless user experience is ensured. In addition, the first part of monitoring is leveraged to create/update persona-based targeted support content to help the user with relevancy. The spanning content tree generator 120 may also spin up another variant or version of the targeted support content by skimming the basics (basic support content) and adding more details to other parts of the basic support content to help expert users.

With continued reference to FIGS. 1-3, FIG. 4 is a diagram illustrating a configuration automation process 400 for configuring or operating one or more assets of an enterprise network based on configuration automation in the targeted support content, according to an example embodiment. The assets of the enterprise network are automatically configured and/or operated by the cloud portal 100 and/or the spanning content tree generator 120 e.g., to collect telemetry data, install a new driver, update firmware, etc. The configuration automation process 400 may be performed by a computing device of FIG. 9, by one or more servers that are enabled to configure the one or more assets of the enterprise network, or by instructions from a cloud to a network controller that controls the assets.

The configuration automation process 400 may address at least some of the problems outlined above such as users abandoning support content and generating a new support case for technical assistance. In one example embodiment, the configuration automation process 400 may involve one or more LLMs and/or generative AI (not shown) not only to provide the targeted support content but also to automate configuration of the one or more assets of the enterprise network i.e., to help the user progress on the journey (complete one or more tasks). For example, the generative AI may generate command line interface (CLI) instructions specific to a respective network device based on explanations or descriptions in the targeted support content.

The configuration automation process 400 starts at 402. At 402, the targeted support content is being displayed on a user interface. For example, the user opens and is viewing the targeted support content such as an article and/or video (multimedia data explaining how to change the configuration or the operation on a target asset of the enterprise network). The targeted support content may explain how to enable a monitoring service or other features on network switches X and Y.

In one example embodiment, the user may become confused and decide to exit the targeted support content e.g., close window, exit the targeted support content. In other words, an abandonment of the targeted support content is being detected. The user may also try skipping a large section of the targeted support content e.g., that provides step-by-step instructions for enabling the feature on the network switch X. In response thereto, "enable configuration" option may be displayed on a user interface. In yet another example embodiment, the enable configuration feature may be part of the targeted support content that is continuously displayed on the user interface.

At 404, a selection of enact automated configuration feature is detected e.g., the user may click on the "enable configuration" option. Instead of a user attempting to execute the steps or actionable tasks defined in the targeted support content, these steps/tasks are automatically performed e.g., by the cloud portal 100 and/or the spanning content tree generator 120.

When enacting automated configuration by selecting the configuration automation feature, at 406, the spanning content tree generator 120 may semantically analyze the support content e.g., a page of the support content currently being viewed by the user. The spanning content tree generator 120 then retrieves discrete steps (actionable computer executable instructions) from the targeted support content. At 408, the spanning content tree generator 120 also retrieves user's configuration information (network information) e.g., network device's configuration.

At 410, a configuration plan is generated for configuring the network device. The configuration plan includes executable instructions or a set of actionable tasks for establishing a connection with the network device e.g., using an application programming interface and for executing instructions that reconfigure the hardware, firmware, or software on this network device. The configuration plan may further include impact of change(s) on the enterprise network i.e., differences or changes that are to be encountered in the network device and/or enterprise network based on the configuration plan. For example, impact of change(s) may describe adjacent devices that would be reconfigured to continue communicating with the reconfigured network device. The configuration plan may be displayed, via a user interface, together with the targeted support content.

Based on detecting a confirmation from a user of the configuration plan, at 412, the configuration plan is executed by connecting (via the API) and configuring or reconfiguring one or more network devices.

In one or more example embodiments, in addition to generating a user-centric experience that empowers the user with personalized, comprehensible, and visually appealing content (targeted support content), ultimately leading to higher completion rates (reducing abandonment of the support content), the spanning content tree generator 120 further aids the user in configuring or operating the network device for the user. When the targeted support content is insufficient for the user to complete the task at hand, the spanning content tree generator 120 bolster users' ability by, for example, offering a button to enact the configuration, which then initiates the configuration automation process 400 of FIG. 4. By integrating AI/LLM/natural language processing (NLP) and embracing potential of generative AI, the techniques presented herein may decrease opening of new support cases for technical assistance while increasing users' satisfaction.

Figure 5:
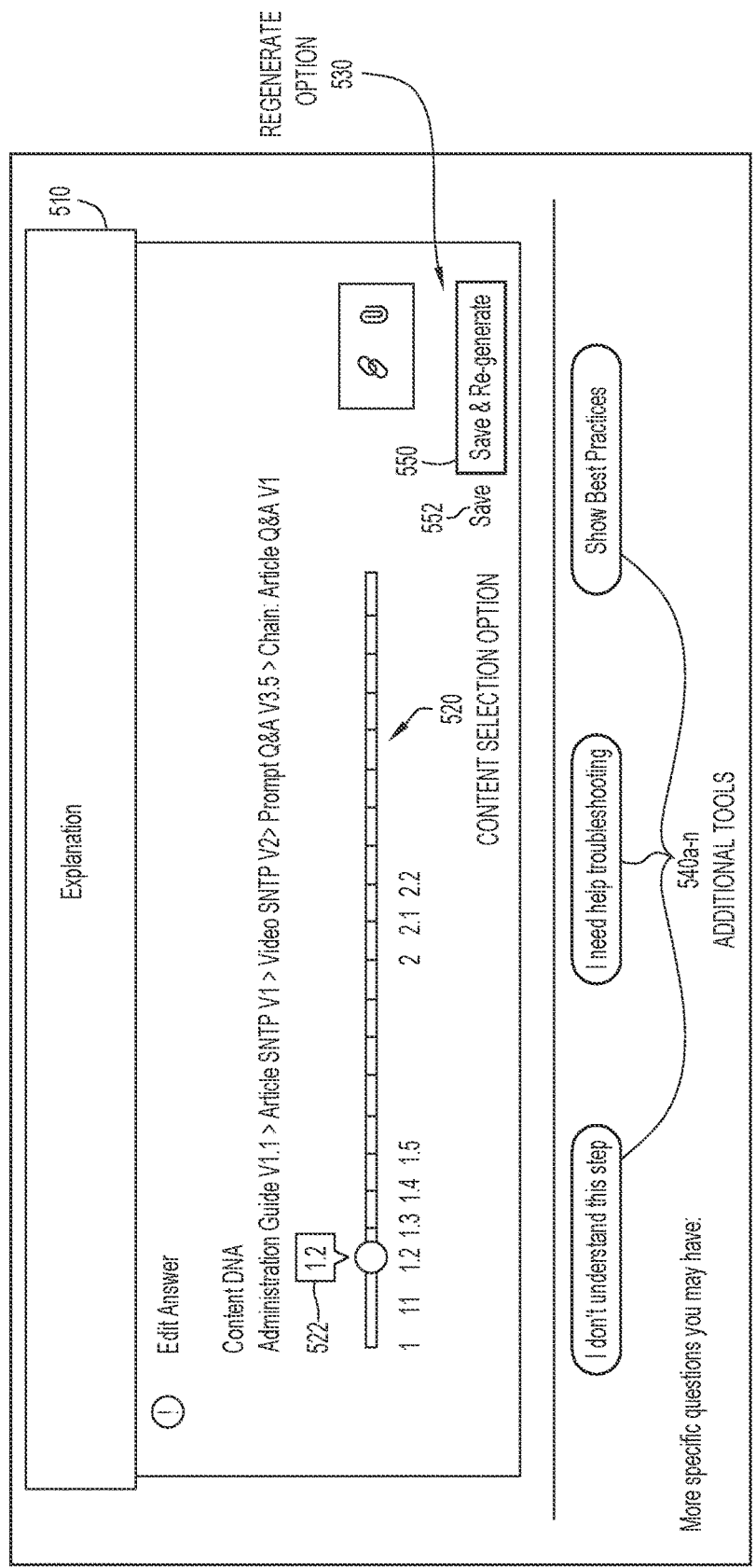
FIG. 5 is a view illustrating a user interface screen for generating, on-demand, variations of a targeted support content, according to an example embodiment.

In one example embodiment, scripts are developed that comprehend a support document (targeted support document) semantically at the step level. Additionally, image analysis may be performed to semantically understand screenshots in the support document. This allows for fine-tuned precision when providing context to the LLM. Additionally, in-document question and answer may be provided, as shown in FIG. 5. As an end-state, the targeted support content is personalized, generated on-demand using available data, and is specific to the user's network configurations appearing in screenshots or even videos.

With continued reference to FIGS. 1-4, FIG. 5 is a view illustrating a user interface screen 500 for generating, on-demand, variations of a targeted support content, according to an example embodiment. Functionally, when a user is interacting with support content, the user may change its form on-demand using the user interface screen 500. The user interface screen 500 includes an explanation 510, content selection option 520, a regeneration option 530, and additional tools 540*a-n*.

Based on user input, targeted support content is displayed. The targeted support content includes multimedia data explaining how to change the configuration or the operation on a target asset of the enterprise network such as the explanation 510. For example, the explanation 510 may be "the latest step ties into the objective of the article by allowing user to set the system time from the configuring computer using hypertext transfer protocol (HTTP). This is an optional step, and it is only necessary if user wants to set the system time from the configuring computer instead of from a simple network time protocol (SNTP) server."

The user, however, may be unfamiliar with the protocols in the explanation 510 or may need a refresher on a particular topic. The user may then manipulate the content selection option 520 and set a content technical level 522 to a beginner level e.g., 1.2. Additionally, using the content selection option 520, the user may also set the "content DNA" to different forms such as an administration guide version 1, 2, . . . , an article for SNTP version 1, 2, . . . , a video for SNTP version 2, a prompt question and answer (Q&A) version 1.5, and/or a chain: article Q & A version 1 (i.e., the chain refers to a sequence of calls to the LLM, whether with a Tool, a Vector retriever, and/or a data processing step). As another example of tuning the content DNA, the user may use the content selection option 520 to set the responses to a particular customized form such as "need a method to only offer changes that are found to be substantive". Based on the foregoing, the configuration plan generated by the configuration automation process 400 may include only substantial impact of changes and omit minor impacts such as telemetry data will be collected at a time interval X instead of a time interval Y. In one example embodiment, the content selection option 520 is for an in-stream consumption and modification of the persona on-demand. The "content DNA" allows for an adjustment of the sources used in RAG retrieval operations.

The user may further manipulate additional tools 540*a-n* to obtain additional details and/or a basic explanation for a step e.g., select "I don't understand this step". By manipulating the additional tools 540*a-n*, the spanning content tree generator 120 may perform configuration actions such as troubleshooting e.g., select "I need help troubleshooting", to resolve a network issue. By manipulating the additional tools 540*a-n*, the system may generate best practices for implementing configuration changes described in the targeted support content (in the explanation 510).

These are just some examples of generating additional tools 540*a-n* and the disclosure is not limited to these examples. The additional tools 540*a-n* may vary depending on the targeted support content (the explanation 510). For example, instead of "I need help troubleshooting", "configure switch with feature A" may be provided. Similarly, the spanning content tree generator 120 may generate "show instructions for this configuration". In short, the additional tools 540*a-n* are different depending on content in the explanation 510.

After the user fine-tunes the content DNA, by selecting the regeneration option 530, new targeted support content is generated e.g., new multimedia data explaining how to change the configuration or the operation on a target asset of the enterprise network and a configuration automation feature. For example, the user may select to save support content generation settings and re-generate the targeted support content (save and regenerate 550). As another example, the user may save the fine-tuning selections for the next support content, by selecting a save option 552. Using the user interface screen 500, the targeted support content is generated on-demand based on user input and preferences.

With continued reference to FIGS. 1-5, FIG. 6 is a diagram illustrating a content generation system 600 that generates a targeted support content specific to an enterprise network based on user input, user persona, and/or a task at hand, according to an example embodiment. The content generation system 600 may be deployed on an apparatus (computing device of FIG. 9), a group of servers, and/or in a cloud.

According to one or more example embodiments, the content generation system 600 may be part of the spanning content tree generator 120 of FIGS. 1 and 2 that generates completed support content 620 (targeted support content). Specifically, the content generation system 600 includes an AI content generator 604, a device emulator 610, a content refinement tool 614, a support content storage 616, a metadata storage 618, and a content performance tracker in a form of a feedback loop 630, which may involve the user interface screen 500 of FIG. 5.

The AI content generator 604 may be an LLM or another AI/ML model. The AI content generator 604 obtains base support content as input 602. The base support content may include a training video, power point document, screenshots, a text document, etc. The AI content generator 604 digests the input 602. Specifically, the AI content generator 604 performs generative artificial intelligence learning on the input 602. The AI content generator 604 analyzes step-by-step the base support content and divides it into various parts such as introduction, description, devices affected, configuration instructions, etc. In other words, the AI content generator 604 analyzes the trunk of a tree or the base content and divides it into parts based on semantic and network related meaning (e.g., introduction, actionable tasks, description of an issue being addressed, etc.).

The AI content generator 604 further digest the journeys 606 and the personas 608 such that targeted support content sets may be generated. That is, the AI content generator 604 spans the tree (adds branches/modifies the trunk of the tree) based on additional context. The AI content generator 604 may generate multiple targeted support content sets, each targeted to a current stage and lifecycle journey, and/or user-persona.

Specifically, the journeys 606 include different lifecycle journeys such as an education journey (obtaining a certification), onboarding a network device journey, a configuration assistance journey, troubleshooting (resolving a network issues) journey, and/or a network resolution journey. Each lifecycle journey may be a different task at hand. The targeted support content thus varies depending on the determined journey. Moreover, each lifecycle journey may involve multiple stages. The task at hand is different depending on the current stage. The targeted support content thus further varies based on the current stage of the lifecycle journey. The AI content generator 604 generates journey-aware targeted support content.

The personas 608 include different user roles and/or skill level. For example, the personas 608 may be a beginner user, an intermediate user, or an advanced user. This is just one example, user persona may consider user certifications, experience, etc. User persona may be specific to the task at hand (or current stage of the lifecycle journey) such as a user has intermediate skill level for network troubleshooting journey based on their certifications and a beginner skill level for onboarding process journey based on experience. The user persona may be detected based on a user profile, user click history, user's past activities, usage of the assets in the enterprise network, and/or user daily tasks.

The AI content generator 604 generates journey-aware and persona specific support content sets. These support content sets are further augmented with network specific information e.g., are tuned to be specific to a particular network asset or device, using the device emulator 610.

The device emulator 610 detects network topology e.g., topology of the enterprise network. Based on the network topology information, the device emulator 610 generates additional support content 612a-k specific to different network devices and tasks at hand. For example, the device emulator 610 generates screenshots and/or videos based on semantic directions from vector search. The additional support content 612a-k is specific to a respective network asset. The additional support content 612a-k may further include automation scripts or configuration instructions specific to the network device.

For example, the additional support content 612a-k may include a content schema 612a (LLM metadata). The content schema 612a may be in a form of LLM metadata such that associated data contains key: value pairs defined before runtime/compilation time. The content schema 612a may include revision histories, document identifiers, and items associated with the content itself such as the original title, objective, applicable devices, and the steps the user takes to complete the configuration. These items are provided as context to the LLM chain, which personalizes the content to a given skill level or even creates new "branch" content.

In one example embodiment, the additional support content 612a-k not only provides automation scripts or configuration instructions specific to a network device but it also encompasses a rich array of support materials (resources) to aid users in managing their devices more effectively. Among these resources, the content schema 612a is meticulously curated to include metadata such as product family, product line, date of publication, software version, and other pertinent details. By incorporating this metadata, the system may reason about the sources it engages with, thereby ensuring relevance and accuracy of the information presented.

In addition to the content schema 612a, the additional support content 612a-k may also include configuration scripts and videos 612b, article content 612c, administrative guide 612d, and/or social media/community content 612e. Complementing these resources, the device emulator 610 augments the content generated by the AI content generator 604 by adding device-specific "leaves" to the "trees" of content. These "leaves" are not only textual but also visual, as the device emulator 610 is responsible for creating ad hoc screenshots that correspond to the support content being generated. These screenshots are tailored to showcase the user's device and network information when available. In cases where specific user information is not accessible, the device emulator 610 generates trunk support content, ensuring that the visual aids remain as relevant and informative as possible.

By implementing the content schema 612a, the system is equipped with a robust framework that may enable handling of various actionable tasks and/or sub-tasks with precision. It may be particularly adept at grounding information from RAG-based sources to prevent the dissemination of generic statements that may not apply to all models. For example, the distinction between type A switches, which support a "stacking" feature and the type B switches, which do not, is clarified. This prevents the RAG system from extracting and utilizing statements that could mislead users about capabilities of their specific devices. The content schema 612a acts as a navigational tool, guiding the system in making discerning choices about source selection and ultimately ensuring the dissemination of tailored, device-specific information.

The targeted support content (tree with branches and leaves may then be provided as completed support content 620 (e.g., the completed content 230 of FIG. 2). Each support content set may be the completed support content 620 or new targeted support content may be generated from multiple support content sets.

In one or more example embodiments, the completed support content 620 may be refined by the content refinement tool 614. The content refinement tool 614 modifies the completed support content 620 using a feedback loop 630. The content refinement tool 614 further updates the completed support content 620 to publish a new support content set (e.g., with an updated version, with unverified information omitted, etc.). In one example embodiment, the content refinement tool 614 may use human experts such as content development team for verifying or updating the support content set.

Figure 7:
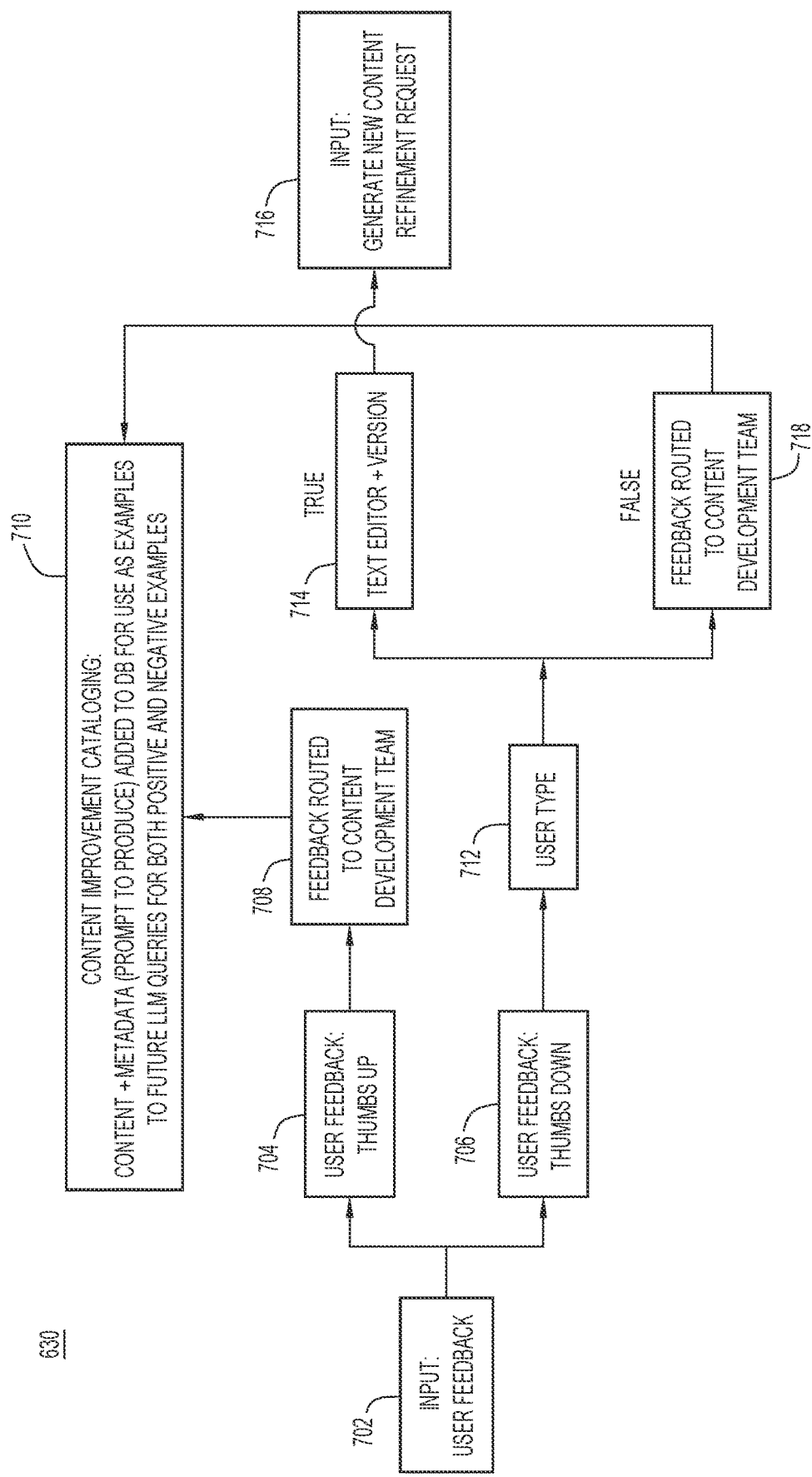
FIG. 7 is a diagram illustrating a feedback loop of FIG. 6 for refining completed support content of FIG. 6 using the user interface screen of FIG. 5, according to an example embodiment.

The completed (and refined) support content set is then stored in the support content storage 616 and associated metadata is stored in the metadata storage 618. The associated metadata may include vectors or embeddings for the completed support content 620 (support content set). The vectors or embeddings may include user persona embeddings, task at hand embeddings, network embeddings, etc. Performance metrics may be indicative of accuracy and/or completeness of respective content set. For example, completed support content 620 may have a high performance metric based on having over hundred prior uses with low abandonment rate. The performance metrics for the completed support content 620 may be assessed based on input provided via the user interface screen 500 of FIG. 5 and/or using the feedback loop 630 of FIG. 7.

Figure 6:
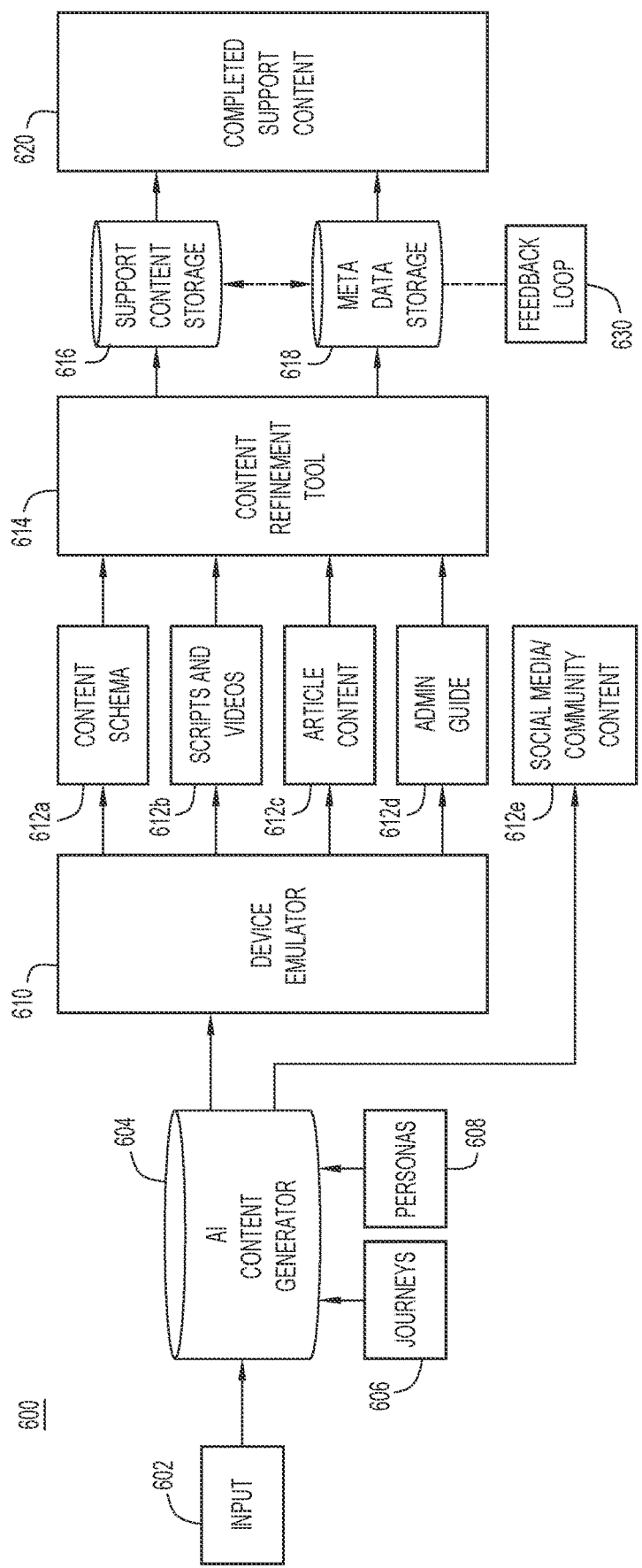
FIG. 6 is a diagram illustrating a content generation system that generates a targeted support content specific to an enterprise network based on user input, user persona, and/or a task at hand, according to an example embodiment.

With continued reference to FIGS. 1-6, FIG. 7 is a diagram illustrating the feedback loop 630 of FIG. 6 for refining the completed support content 620 of FIG. 6 using the user interface screen 500 of FIG. 5, according to an example embodiment.

The feedback loop 630 involves a natural language processing chat-based interface evaluation dashboard (e.g., the user interface screen 500 of FIG. 5) that detects performance of a respective support content set (e.g., abandoned, portions skipped, additional follow-up questions, etc.). The feedback loop 630 tracks performance of the support content sets for management and accuracy. Based on the feedback loop 630, some of the support content sets may be stored as bad examples in the support content storage 616. That is, performance metrics for the completed support content is not only generated programmatically during content creation but also based on prior usage using the feedback loop 630, for example.

Specifically, the feedback loop 630 starts at 702, in which user feedback is input (e.g., using the user interface screen 500 of FIG. 5). User feedback may be positive e.g., a thumbs up 704 or negative e.g., a thumbs down 706. In one example embodiment, the input may be inferred based on detecting that users are abandoning the support content, based on detecting various follow up questions, and/or based on detecting that portions of the support content are being skipped.

Based on the thumbs up 704, the feedback may be routed to a content development team, at 708 and provided to the LLM, at 710 (i.e., the AI content generator 604, as a good example or the one that has high performance metrics). Completed support content and its metadata (prompt to produce) may be added to a data store (e.g., chat-based database 220) for usage in future LLM queries.

Based on the thumbs down 706, the feedback loop 630 involves detecting a user type 712. For example, if the user type 712 is such that the user is authorized to modify the completed support content, then, the feedback loop 630 displays a text editor to the user, at 714. The text editor may display version history of the completed support content and allow the user to make edits. At 716, a refinement request is generated such that the completed support content is modified and updated completed support content is stored in the data store such as chat-based database 220. On the other hand, if the user type 712 is such that the user is not authorized to modify the support content, at 718, the feedback may be routed to content development team for modifications and/or the completed support content is stored in the data store as a negative example for the LLM, at 710. Using the feedback loop 630, the content performance metrics (generated programmatically during content creation) may also be generated based on prior usage.

As such, the techniques presented herein generate targeted support content at an intersection of AI and human creativity. AI and LLM applications ingest a discrete training course as a "seed content" (trunk of a tree), where output (completed content) is a slate of persona based content that is built upon by humans. Closing the loop on configurations by automating the deployment of the configuration to user's selected network. The techniques presented herein leverage both worlds (AI and human) to provide more complete solutions for self-serve users.

The techniques presented herein provide a support content copilot in which LLMs further generate questions (additional tools) about targeted support content at user specified intervals (Section, Each Step, Conclusion). This feature paired with spanning content tree allows for completed content (targeted support content) that is persona-based, journey-aware, and is on-demand.

The techniques presented herein may enhance clarity and comprehension of the support content by personalizing the content for each user and their specific devices (enterprise network assets). The techniques presented herein may generate a user-friendly language, transforming complex technical concepts into easily digestible explanations.

In one or more example embodiments, by analyzing user preferences, historical data (including prior usage), and contextual information, the spanning content tree generator 120 dynamically adapts the targeted support content to align with user's needs (e.g., current stage of the lifecycle journey) and device capabilities. This personalization and/or customization may ensure a seamless and tailored user experience, facilitating a deeper understanding of the configuration process and increasing user engagement.

The techniques presented herein may also account grounding/baselining information such as relevant content chunks from the administration guide, negative or poorly received content in a similar category, and content enrichment. For example, the techniques may assess user's profile, search for similar, highly rated content, return or provide the completed content, and compare the completed content against live analytics to determine if there are significant differences and the reasons for those differences. These analytics are then distilled into an insightful or helpful tips based on content personalization preferences.

The techniques presented herein may involve profiling, grounding, and enrichment i.e., chains versioned and benchmarked (in LangChain). In the techniques presented herein, each meta-prompt to generate the completed support content may be a live definition, the performance of which is monitored and tracked via the content DNA. As such, user's experience is a choose-your-own support adventure driven toward the user's goal hosted by generative AI.

Figure 8:
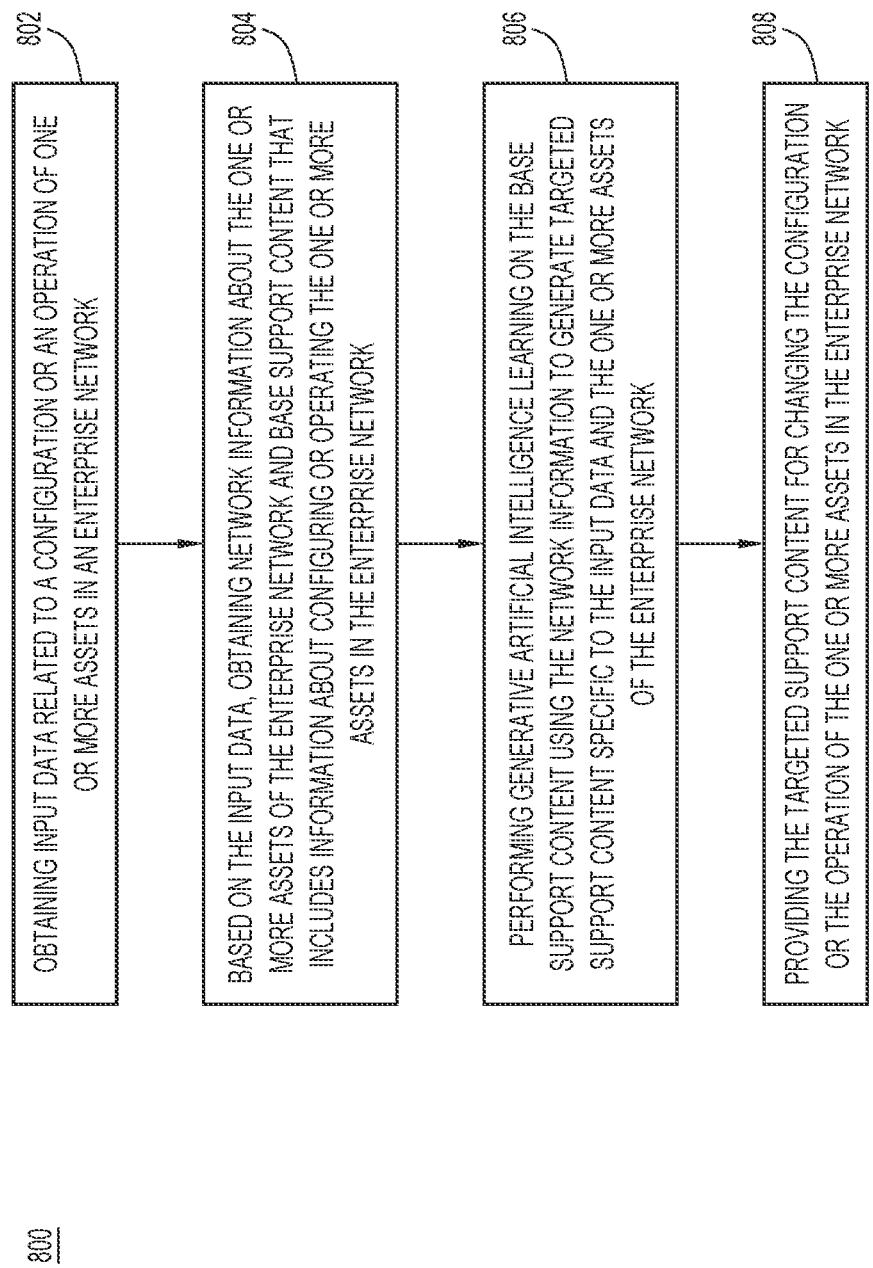
FIG. 8 is a flowchart illustrating a computer-implemented method in which targeted support content is provided for changing a configuration or an operation of one or more assets in an enterprise network, according to an example embodiment.

FIG. 8 is a flowchart illustrating a computer-implemented method 800 in which targeted support content is provided for changing a configuration or an operation of one or more assets in the enterprise network, according to an example embodiment. The computer-implemented method 800 may be performed by a computing device of FIG. 9 and/or one or more servers that implement a system and/or devices described above with reference to FIGS. 1-8, and/or in cloud.

The computer-implemented method 800 involves at 802, obtaining input data related to a configuration or an operation of one or more assets in an enterprise network.

The computer-implemented method 800 further involves at 804, based on the input data, obtaining network information about the one or more assets of the enterprise network and base support content that includes information about configuring or operating the one or more assets in the enterprise network.

The computer-implemented method 800 further involves at 806, performing generative artificial intelligence learning on the base support content using the network information to generate targeted support content specific to the input data and the one or more assets of the enterprise network.

The computer-implemented method 800 further involves at 808, providing the targeted support content for changing the configuration or the operation of the one or more assets in the enterprise network.

In one form, the targeted support content may include a set of actionable tasks to be performed with respect to the one or more assets of the enterprise network. The computer-implemented method 800 may further include changing the configuration of one or more network devices in the enterprise network by performing the set of actionable tasks from the targeted support content.

In one instance, changing the configuration of the one or more network devices may include establishing a connection with each of the one or more network devices using an application programming interface and reconfiguring a hardware or a firmware on a respective network device.

According to one or more example embodiments, the computer-implemented method 800 may further include controlling the computing device to perform the set of actionable tasks in the targeted support content based on detecting an abandonment of the targeted support content that is being provided or a creation of a new support case for technical assistance related to the input data.

In another form, the operation 808 of providing the targeted support content may include displaying, via a user interface, the targeted support content including multimedia data explaining how to change the configuration or the operation on a target asset of the enterprise network and a configuration automation feature. The operation 808 of providing the targeted support content may further include changing the configuration or the operation of the target asset based on a selection of the configuration automation feature.

In one instance, the computer-implemented method 800 may further involve generating at least one screenshot or a video about how to perform an action on the target asset based on emulating the target asset and adding the at least one screenshot or the video to the targeted support content.

In yet another form, the input data may be a user query. The operation 806 of performing generative artificial intelligence learning on the base support content using the network information to generate targeted support content may include generating one or more meta-prompts for performing the generative artificial intelligence learning by augmenting the user query with contextual metadata related to one or more of a user persona or a task at hand.

In one instance, the network information may include a topology of the enterprise network and data related to a plurality of network features of a plurality of assets in the enterprise network. The operation of augmenting the user query with the contextual metadata may include generating a user embedding indicative of the user persona based on one or more of a user profile, a user role within the enterprise network, or user activity history. The operation of augmenting the user query with the contextual metadata may further include augmenting the one or more meta-prompts with the user embedding to generate a completed meta-prompt.

In another instance, the network information may include a topology of the enterprise network and data related to a plurality of network features of a plurality of assets in the enterprise network. The operation of augmenting the user query with the contextual metadata may include determining, for each of the one or more assets, a current stage of a plurality of stages in a lifecycle journey of a respective asset and generating a task embedding indicative of the task at hand based on the current stage of the respective asset. The operation of augmenting the user query with the contextual metadata may further include augmenting the one or more meta-prompts with the task embedding to generate a completed meta-prompt.

In yet another form, the computer-implemented method 800 may further include obtaining, from a knowledge base, a plurality of support content sets based on the input data and selecting one or more of the plurality of support content sets as the base support content for performing the generative artificial intelligence learning, based on content performance.

In one instance, the content performance may include content performance metrics generated programmatically during content creation and based on prior usage.

In another instance, the content performance may be based on one or more prior abandonments of a respective support content set.

According to one or more example embodiment, the operation 806 of performing the generative artificial intelligence learning of the base support content may include providing, to a large language model, a plurality of support content sets having different performance metrics, to generate the targeted support content.

Figure 9:
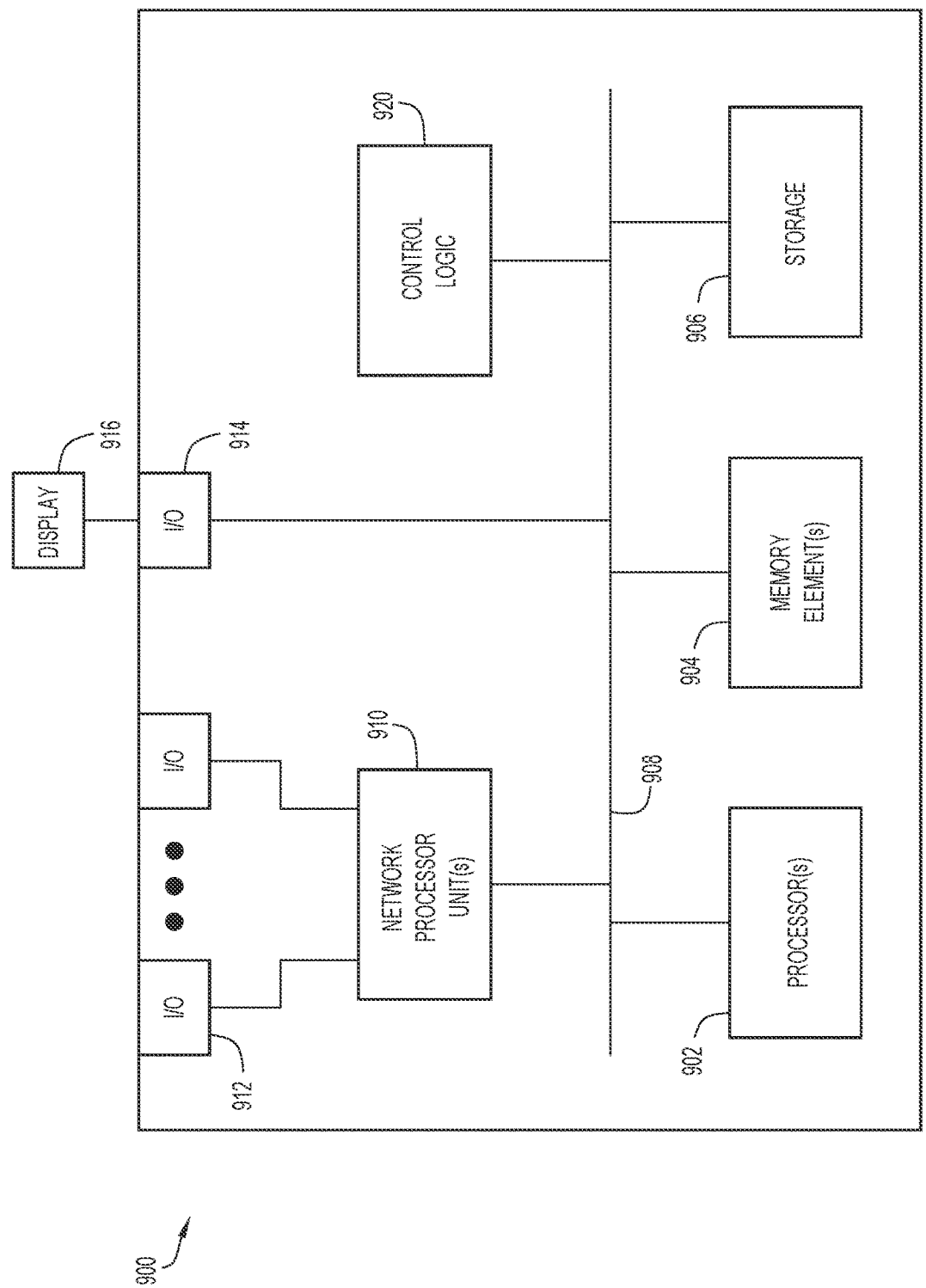
FIG. 9 is a hardware block diagram of a computing device that may perform functions associated with any combination of operations in connection with the techniques depicted and described in FIGS. 1-8, according to various example embodiments.

FIG. 9 is a hardware block diagram of a computing device 900 that may perform functions associated with any combination of operations in connection with the techniques depicted in FIGS. 1-8, according to various example embodiments, including, but not limited to, operations of a console that may be executing a web browser or another network management system and providing UIs such as the user interface screen 500 of FIG. 5, one or more servers executing systems of FIGS. 1-4, 6, and 7, and/or a network device such as an asset of an enterprise network. It should be appreciated that FIG. 9 provides only an illustration of one example embodiment and does not imply any limitations with regard to the environments in which different embodiments may be implemented. Many modifications to the depicted environment may be made.

In at least one embodiment, computing device 900 may include one or more processor(s) 902, one or more memory element(s) 904, storage 906, a bus 908, one or more network processor unit(s) 910 interconnected with one or more network input/output (I/O) interface(s) 912, one or more I/O interface(s) 914, and control logic 920. In various embodiments, instructions associated with logic for computing device 900 can overlap in any manner and are not limited to the specific allocation of instructions and/or operations described herein.

In at least one embodiment, processor(s) 902 is/are at least one hardware processor configured to execute various tasks, operations and/or functions for computing device 900 as described herein according to software and/or instructions configured for computing device 900. Processor(s) 902 (e.g., a hardware processor) can execute any type of instructions associated with data to achieve the operations detailed herein. In one example, processor(s) 902 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, one or more memory element(s) 904 and/or storage 906 is/are configured to store data, information, software, and/or instructions associated with computing device 900, and/or logic configured for memory element(s) 904 and/or storage 906. For example, any logic described herein (e.g., control logic 920) can, in various embodiments, be stored for computing device 900 using any combination of memory element(s) 904 and/or storage 906. Note that in some embodiments, storage 906 can be consolidated with one or more memory elements 904 (or vice versa), or can overlap/exist in any other suitable manner.

In at least one embodiment, bus 908 can be configured as an interface that enables one or more elements of computing device 900 to communicate in order to exchange information and/or data. Bus 908 can be implemented with any architecture designed for passing control, data and/or information between processors, memory elements/storage, peripheral devices, and/or any other hardware and/or software components that may be configured for computing device 900. In at least one embodiment, bus 908 may be implemented as a fast kernel-hosted interconnect, potentially using shared memory between processes (e.g., logic), which can enable efficient communication paths between the processes.

In various embodiments, network processor unit(s) 910 may enable communication between computing device 900 and other systems, entities, etc., via network I/O interface(s) 912 to facilitate operations discussed for various embodiments described herein. In various embodiments, network processor unit(s) 910 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 900 and other systems, entities, etc. to facilitate operations for various embodiments described herein. In various embodiments, network I/O interface(s) 912 can be configured as one or more Ethernet port(s), Fibre Channel ports, and/or any other I/O port(s) now known or hereafter developed. Thus, the network processor unit(s) 910 and/or network I/O interface(s) 912 may include suitable interfaces for receiving, transmitting, and/or otherwise communicating data and/or information in a network environment.

I/O interface(s) 914 allow for input and output of data and/or information with other entities that may be connected to computing device 900. For example, I/O interface(s) 914 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor 916, a display screen, or the like.

In various embodiments, control logic 920 can include instructions that, when executed, cause processor(s) 902 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

In another example embodiment, an apparatus is provided configured to generate, on-demand, persona-based and journey-aware support content using machine learning and/or artificial intelligence. The apparatus includes a memory, a network interface configured to enable network communications and a processor. The processor is configured to perform obtaining input data related to a configuration or an operation of one or more assets in an enterprise network and based on the input data, obtaining network information about the one or more assets of the enterprise network and base support content that includes information about configuring or operating the one or more assets in the enterprise network. The processor is further configured to perform generative artificial intelligence learning on the base support content using the network information to generate targeted support content specific to the input data and the one or more assets of the enterprise network. The processor is further configured to provide the targeted support content for changing the configuration or the operation of the one or more assets in the enterprise network.

In yet another example embodiment, one or more non-transitory computer readable storage media encoded with instructions are provided. When the media is executed by a processor, the instructions cause the processor to perform a method involving obtaining input data related to a configuration or an operation of one or more assets in an enterprise network and based on the input data, obtaining network information about the one or more assets of the enterprise network and base support content that includes information about configuring or operating the one or more assets in the enterprise network. The method further includes performing generative artificial intelligence learning on the base support content using the network information to generate targeted support content specific to the input data and the one or more assets of the enterprise network. The method further involves providing the targeted support content for changing the configuration or the operation of the one or more assets in the enterprise network.

In yet another example embodiment, a system is provided that includes the devices and operations explained above with reference to FIGS. 1-9.

The programs described herein (e.g., control logic 920) may be identified based upon the application(s) for which they are implemented in a specific embodiment. However, it should be appreciated that any particular program nomenclature herein is used merely for convenience, and thus the embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, the storage 906 and/or memory elements(s) 904 can store data, software, code, instructions (e.g., processor instructions), logic, parameters, combinations thereof, and/or the like used for operations described herein. This includes the storage 906 and/or memory elements(s) 904 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication(NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein, the terms may be used in a generic sense to include packets, frames, segments, datagrams, and/or any other generic units that may be used to transmit communications in a network environment. Generally, the terms reference to a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A computer-implemented method comprising:
    obtaining input data related to a configuration or an operation of one or more assets in an enterprise network;
    based on the input data, obtaining network information about the one or more assets of the enterprise network and base support content that includes information about configuring or operating the one or more assets in the enterprise network;
    performing generative artificial intelligence learning on the base support content using the network information to generate targeted support content specific to the input data and the one or more assets of the enterprise network;
    displaying, via a user interface, the targeted support content including multimedia data explaining how to change the configuration or the operation on a target asset of the enterprise network and a configuration automation feature; and
    changing, by a computing device, the configuration or the operation of the target asset based on a selection of the configuration automation feature.

2. The computer-implemented method of claim 1, wherein the targeted support content includes a set of actionable tasks to be performed with respect to the one or more assets of the enterprise network.

3. The computer-implemented method of claim 2, wherein changing the configuration of the target asset includes:
    establishing, by the computing device, a connection with the target asset using an application programming interface; and
    reconfiguring, by the computing device, a hardware or a firmware on the target asset.

4. The computer-implemented method of claim 3, further comprising:
    controlling the computing device to perform the set of actionable tasks in the targeted support content based on detecting an abandonment of the targeted support content that is being provided or a creation of a new support case for technical assistance related to the input data.

5. The computer-implemented method of claim 1, further comprising:
    generating at least one screenshot or a video about how to perform an action on the target asset based on emulating the target asset; and
    adding the at least one screenshot or the video to the targeted support content.

6. The computer-implemented method of claim 1, wherein the input data is a user query, and generating the targeted support content further includes:
    generating one or more meta-prompts for performing the generative artificial intelligence learning by augmenting the user query with contextual metadata related to one or more of a user persona or a task at hand.

7. The computer-implemented method of claim 6, wherein the network information includes a topology of the enterprise network and data related to a plurality of network features of a plurality of assets in the enterprise network, and augmenting the user query with the contextual metadata includes:
    generating a user embedding indicative of the user persona based on one or more of a user profile, a user role within the enterprise network, or user activity history; and
    augmenting the one or more meta-prompts with the user embedding to generate a completed meta-prompt.

8. The computer-implemented method of claim 6, wherein the network information includes a topology of the enterprise network and data related to a plurality of network features of a plurality of assets in the enterprise network, and augmenting the user query with the contextual metadata includes:
    determining, for each of the one or more assets, a current stage of a plurality of stages in a lifecycle journey of a respective asset;
    generating a task embedding indicative of the task at hand based on the current stage of the respective asset; and
    augmenting the one or more meta-prompts with the task embedding to generate a completed meta-prompt.

9. The computer-implemented method of claim 1, further comprising:
    obtaining, from a knowledge base, a plurality of support content sets based on the input data; and
    selecting one or more of the plurality of support content sets as the base support content for performing the generative artificial intelligence learning, based on content performance.

10. The computer-implemented method of claim 9, wherein the content performance includes content performance metrics generated programmatically during content creation and based on prior usage.

11. The computer-implemented method of claim 9, wherein the content performance is based on one or more prior abandonments of a respective support content set.

12. The computer-implemented method of claim 1, wherein performing the generative artificial intelligence learning of the base support content includes:
    providing, to a large language model, a plurality of support content sets having different performance metrics, to generate the targeted support content.

13. An apparatus comprising:
    a memory;
    a network interface configured to enable network communications; and
    a processor, wherein the processor is configured to perform a method comprising:
        obtaining input data related to a configuration or an operation of one or more assets in an enterprise network;
        based on the input data, obtaining network information about the one or more assets of the enterprise network and base support content that includes information about configuring or operating the one or more assets in the enterprise network;
        performing generative artificial intelligence learning on the base support content using the network information to generate targeted support content specific to the input data and the one or more assets of the enterprise network;
        displaying, via a user interface, the targeted support content including multimedia data explaining how to change the configuration or the operation on a target asset of the enterprise network and a configuration automation feature; and changing the configuration or the operation of the target asset based on a selection of the configuration automation feature.

14. The apparatus of claim 13, wherein the targeted support content includes a set of actionable tasks to be performed with respect to the one or more assets of the enterprise network.

15. The apparatus of claim 14, wherein the processor is configured to change the configuration of the target asset by:
   establishing a connection with the target asset using an application programming interface; and
   reconfiguring a hardware or a firmware on the target asset.

16. The apparatus of claim 15, where the processor is further configured to perform:
   controlling the apparatus to perform the set of actionable tasks in the targeted support content based on detecting an abandonment of support content that is being provided or a creation of a new support case for technical assistance related to the input data.

17. One or more non-transitory computer readable storage media encoded with software comprising computer executable instructions that, when executed by a processor, cause the processor to perform a method including:
   obtaining input data related to a configuration or an operation of one or more assets in an enterprise network;
   based on the input data, obtaining network information about the one or more assets of the enterprise network and base support content that includes information about configuring or operating the one or more assets in the enterprise network;
   performing generative artificial intelligence learning on the base support content using the network information to generate targeted support content specific to the input data and the one or more assets of the enterprise network; and
   displaying, via a user interface, the targeted support content including multimedia data explaining how to change the configuration or the operation on a target asset of the enterprise network and a configuration automation feature; and
   changing the configuration or the operation of the target asset based on a selection of the configuration automation feature.

18. The one or more non-transitory computer readable storage media according to claim 17, wherein the targeted support content includes a set of actionable tasks to be performed with respect to the one or more assets of the enterprise network.

19. The one or more non-transitory computer readable storage media according to claim 18, wherein the computer executable instructions cause the processor to change the configuration of the target asset by:
   establishing a connection with the target asset using an application programming interface; and
   reconfiguring a hardware or a firmware on the target asset.

20. The one or more non-transitory computer readable storage media according to claim 17, wherein the computer executable instructions cause the processor to perform the generative artificial intelligence learning of the base support content by:
   providing, to a large language model, a plurality of support content sets having different performance metrics, to generate the targeted support content.

* * * * *